United States Patent
Hamagami et al.

(10) Patent No.: US 11,491,993 B2
(45) Date of Patent: Nov. 8, 2022

(54) INFORMATION PROCESSING SYSTEM, PROGRAM, AND CONTROL METHOD

(71) Applicant: TOYOTA JIDOSHA KABUSHIKI KAISHA, Toyota (JP)

(72) Inventors: Kana Hamagami, Nissin (JP); Takuya Maekawa, Nissin (JP); Yosuke Nakayama, Owariasahi (JP); Akitoshi Jikumaru, Nissin (JP); Tae Sugimura, Miyoshi (JP); Takao Hishikawa, Nagoya (JP); Shinichi Adachi, Takahama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 437 days.

(21) Appl. No.: 16/668,213

(22) Filed: Oct. 30, 2019

(65) Prior Publication Data
US 2020/0172111 A1   Jun. 4, 2020

(30) Foreign Application Priority Data

Dec. 3, 2018  (JP) .............................. JP2018-226454

(51) Int. Cl.
*B60W 40/08* (2012.01)
*G10L 25/63* (2013.01)
(Continued)

(52) U.S. Cl.
CPC ............ *B60W 40/08* (2013.01); *B60W 30/08* (2013.01); *B60W 50/0098* (2013.01);
(Continued)

(58) Field of Classification Search
CPC ...... B60W 40/08; B60W 30/18; B60W 50/08; B60W 2420/42; B60W 2556/00;
(Continued)

(56) References Cited

U.S. PATENT DOCUMENTS

2002/0101354 A1* 8/2002 Banas .................... G08B 21/06
                                                    340/576
2008/0180235 A1* 7/2008 Chang ..................... A61B 5/165
                                                    340/449
(Continued)

FOREIGN PATENT DOCUMENTS

CN     108001451 A    5/2018
JP     2003-14474 A   1/2003
(Continued)

*Primary Examiner* — Jason Holloway
(74) *Attorney, Agent, or Firm* — Oblon, McClelland, Maier & Neustadt, L.L.P.

(57) ABSTRACT

An information processing system includes a vehicle and an information processing device configured to transmit and receive information to and from the vehicle. The vehicle is configured to acquire information on an occupant in a cabin of the vehicle, and operate to affect a perception of the occupant. The information processing device is configured to store a cause of an accident caused by a passenger of the vehicle and control information for operating the operating unit to eliminate the cause of the accident, and transmit the control information to the operating unit of the vehicle when determination is made that the cause of the accident occurs based on the information on the occupant. The vehicle is configured to operate to eliminate the cause of the accident when the control information is received.

18 Claims, 5 Drawing Sheets

| POINT P AT WHICH ACCIDENT OCCURRED | CAUSE OF ACCIDENT | CONTROL INFORMATION |
|---|---|---|
| P1 | PASSENGER WAS VIOLENTLY NOISY | CONTROL INFORMATION ON VOICE OUTPUT FOR PROMPTING PASSENGER TO BE CAREFUL IN SPEECH AND BEHAVIOR |
| P2 | INSIDE OF VEHICLE CABIN WAS HOT AND STUFFY | CONTROL INFORMATION FOR ALLOWING AIR CONDITIONING OF INSIDE OF VEHICLE CABIN TO BE ADAPTED FOR PASSENGER |
| ⋮ | ⋮ | ⋮ |

(51) Int. Cl.
*G10L 15/22* (2006.01)
*G06V 20/59* (2022.01)
*G06V 40/20* (2022.01)
*B60W 30/08* (2012.01)
*B60W 50/00* (2006.01)

(52) U.S. Cl.
CPC .............. *G06V 20/59* (2022.01); *G06V 40/20* (2022.01); *G10L 15/22* (2013.01); *G10L 25/63* (2013.01); *B60W 2420/42* (2013.01); *B60W 2540/01* (2020.02); *B60W 2540/22* (2013.01); *B60W 2556/10* (2020.02)

(58) Field of Classification Search
CPC ......... B60W 2530/00; B60W 2540/01; B60W 2540/21; B60W 2540/223; B60W 2556/45; B60W 50/14; B60W 30/095; G06V 20/59; G06V 40/20; G06V 40/10; G06V 40/174; G10L 15/22; G10L 25/63; H04L 67/025; H04L 67/12; H04L 67/18
See application file for complete search history.

(56) References Cited

U.S. PATENT DOCUMENTS

| | | |
|---|---|---|
| 2013/0054090 A1 | 2/2013 | Shin et al. |
| 2018/0257669 A1* | 9/2018 | Makke ................. G09B 21/009 |
| 2019/0213429 A1* | 7/2019 | Sicconi ................. G06F 3/0346 |

FOREIGN PATENT DOCUMENTS

| | | |
|---|---|---|
| JP | 2005-313658 A | 11/2005 |
| JP | 2008-217113 A | 9/2008 |
| JP | 2012-25270 A | 2/2012 |
| JP | 2013-150245 A | 8/2013 |
| JP | 2018-185688 A | 11/2018 |
| WO | WO 2008/038340 A1 | 4/2008 |

* cited by examiner

FIG. 4

| POINT P AT WHICH ACCIDENT OCCURRED | CAUSE OF ACCIDENT | CONTROL INFORMATION |
|---|---|---|
| P1 | PASSENGER WAS VIOLENTLY NOISY | CONTROL INFORMATION ON VOICE OUTPUT FOR PROMPTING PASSENGER TO BE CAREFUL IN SPEECH AND BEHAVIOR |
| P2 | INSIDE OF VEHICLE CABIN WAS HOT AND STUFFY | CONTROL INFORMATION FOR ALLOWING AIR CONDITIONING OF INSIDE OF VEHICLE CABIN TO BE ADAPTED FOR PASSENGER |
| ... | ... | ... |

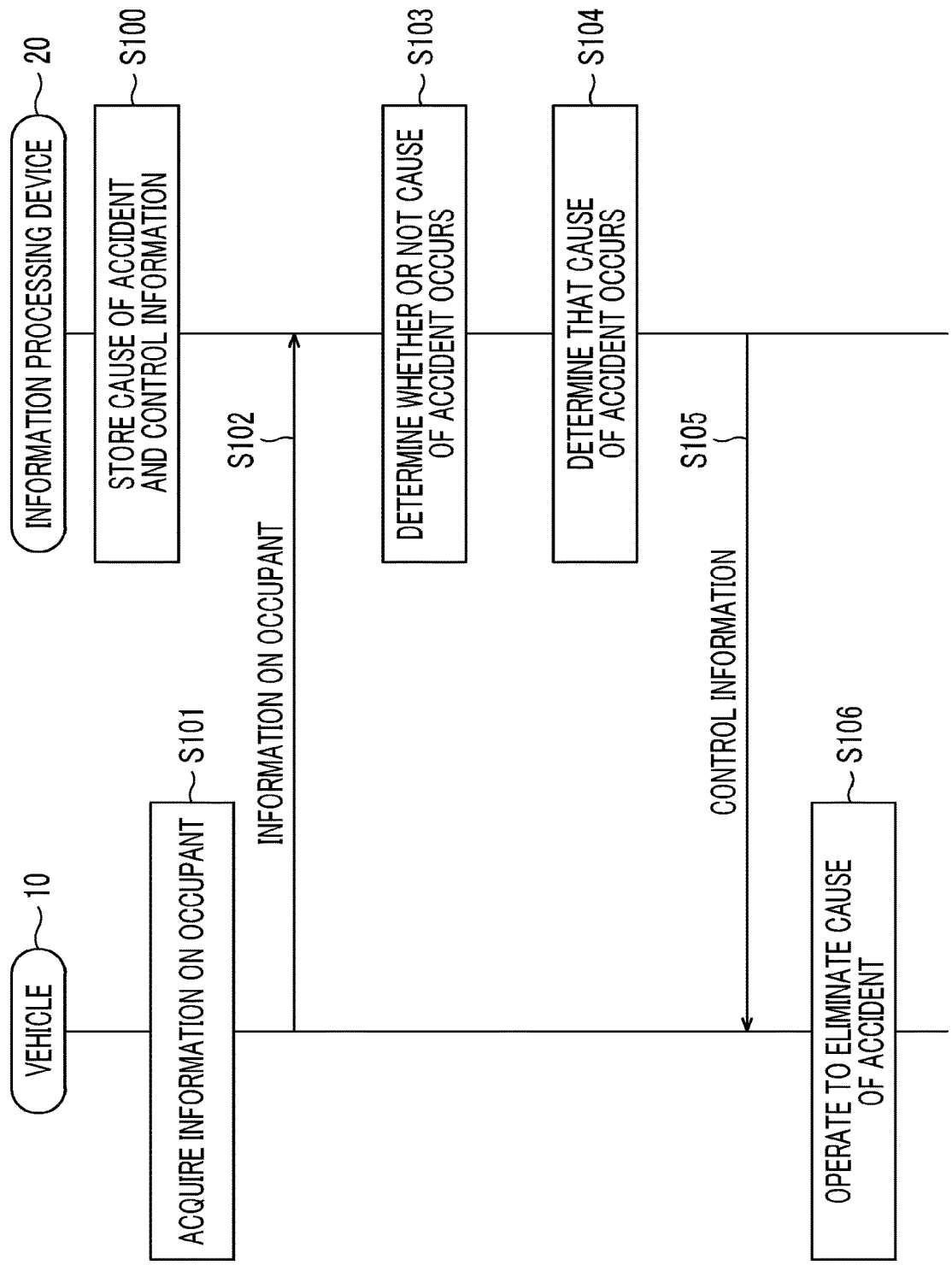

INFORMATION PROCESSING SYSTEM, PROGRAM, AND CONTROL METHOD

INCORPORATION BY REFERENCE

The disclosure of Japanese Patent Application No. 2018-226454 filed on Dec. 3, 2018 including the specification, drawings and abstract is incorporated herein by reference in its entirety.

BACKGROUND

1. Technical Field

The disclosure relates to an information processing system, a program, and a control method.

2. Description of Related Art

In the related art, a technique that provides prediction information of an accident to a driver of a vehicle and prevents the accident is known. For example, Japanese Unexamined Patent Application Publication No. 2003-014474 (JP 2003-014474 A) discloses a vehicle navigation device that outputs, before the vehicle passes through a past accident occurrence position, warning information added with information on an accident occurrence situation to the driver in a case where a common situation element between an accident occurrence situation at past accident occurrence and a current traveling situation of the vehicle is present as a result obtained by comparing the accident occurrence situation and the current traveling situation with each other.

SUMMARY

For example, a speech and behavior of a passenger may affect a driver and cause an accident. In a case where such a cause of the accident caused by the passenger occurs, it is desirable to eliminate the cause of the accident and to reduce a probability of occurrence of the accident.

The disclosure provides an information processing system, a program, and a control method capable of reducing a probability of occurrence of an accident in consideration of a passenger of a vehicle.

A first aspect of the disclosure relates to an information processing system. The information processing system includes a vehicle and an information processing device configured to transmit and receive information to and from the vehicle. The vehicle includes an occupant information acquisition unit configured to acquire information on an occupant in a cabin of the vehicle, and an operating unit configured to operate to affect a perception of the occupant. The information processing device includes a controller and a storage unit. The storage unit is configured to store a cause of an accident caused by a passenger of the vehicle and control information for operating the operating unit to eliminate the cause of the accident, the controller is configured to transmit the control information to the operating unit of the vehicle when determination is made that the cause of the accident occurs based on the information on the occupant, and the operating unit of the vehicle is configured to operate to eliminate the cause of the accident when the control information is received.

A second aspect of the disclosure relates to a program that operates in an information processing system including a vehicle and an information processing device configured to transmit and receive information to and from the vehicle. The program causes the vehicle to execute a step of acquiring information on an occupant in a cabin of the vehicle and an operating step of operating to affect a perception of the occupant. The program causes the information processing device to execute a step of storing a cause of an accident caused by a passenger of the vehicle and control information used in the operating step to eliminate the cause of the accident, a step of determining whether or not the cause of the accident occurs based on the information on the occupant, and a step of transmitting the control information to the vehicle when determination is made that the cause of the accident occurs. When the vehicle receives the control information, the operating step operates to eliminate the cause of the accident.

A third aspect of the disclosure relates to a control method in an information processing system including a vehicle and an information processing device configured to transmit and receive information to and from the vehicle. The control method includes, in the vehicle, a step of acquiring information on an occupant in a cabin of the vehicle and an operating step of operating to affect a perception of the occupant. The control method includes, in the information processing device, a step of storing a cause of an accident caused by a passenger of the vehicle and control information used in the operating step to eliminate the cause of the accident, a step of determining whether or not the cause of the accident occurs based on the information on the occupant, and a step of transmitting the control information to the vehicle when determination is made that the cause of the accident occurs. When the vehicle receives the control information, the operating step operates to eliminate the cause of the accident.

With the information processing system, the program, and the control method according to the aspects of the disclosure, it is possible to reduce a probability of occurrence of an accident in consideration of a passenger of a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a table showing a specific example of information stored in a storage unit of the information processing device; and FIG. 5 is a sequence diagram showing an example of an operation flow of the information processing system.

DETAILED DESCRIPTION OF EMBODIMENTS

Hereinafter, an embodiment of the disclosure will be described with reference to the accompanying drawings.

Information Processing System

Figure 1:
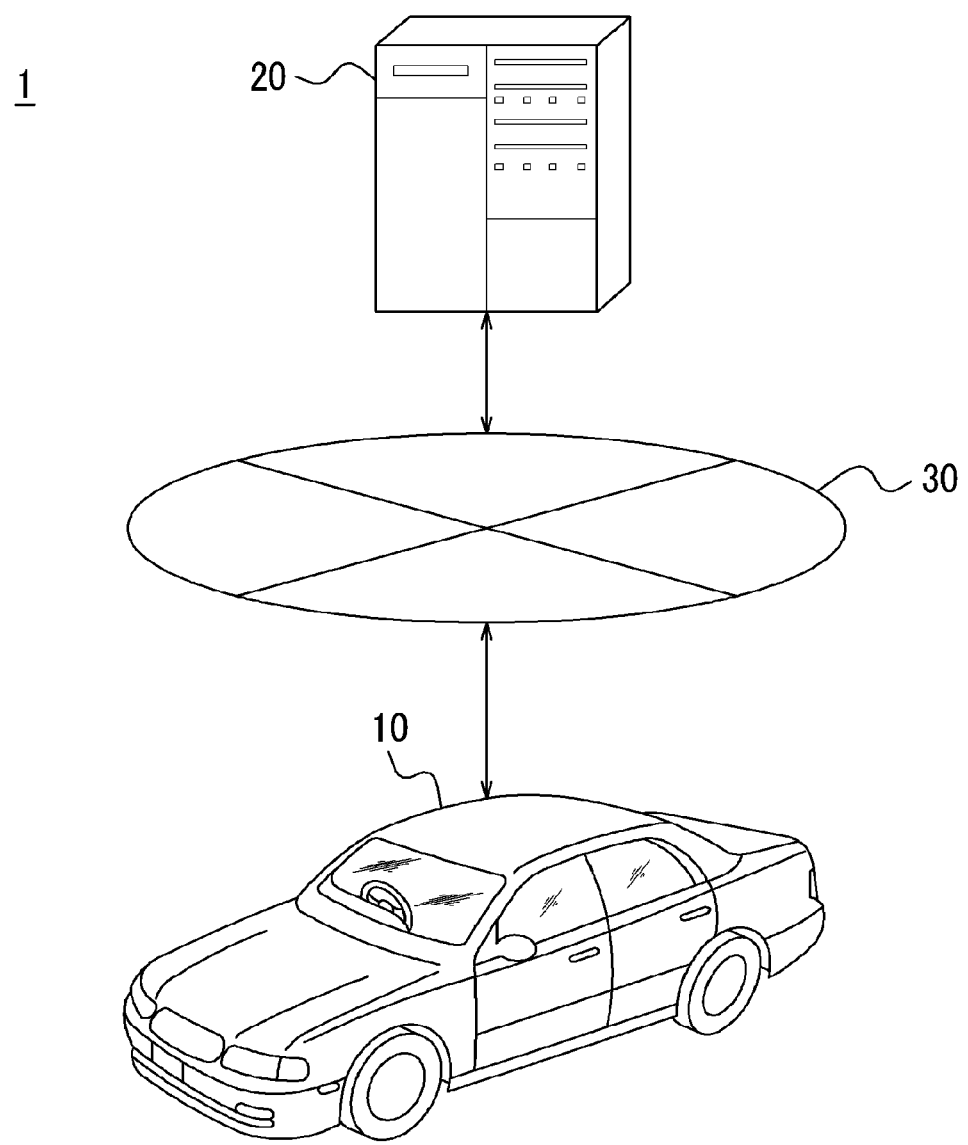
FIG. 1 is a diagram showing a schematic configuration of an information processing system according to an embodiment of the disclosure.

FIG. 1 is a diagram showing a schematic configuration of an information processing system 1 according to the embodiment of the disclosure. The configuration and functions of the information processing system 1 according to the embodiment of the disclosure will be mainly described with reference to FIG. 1.

The information processing system 1 includes a vehicle 10 and an information processing device 20. The vehicle 10 and the information processing device 20 are communicatively connected with a network 30 including, for example, a mobile communication network and the Internet. The vehicle 10 and the information processing device 20 mutually transmit and receive information through the network 30.

The vehicle 10 is, for example, an automobile, but is not limited thereto, and may be any vehicle for a human to get in. The vehicle 10 is a vehicle driven by a driver, but is not limited thereto, and may be, for example, a vehicle that performs an autonomous driving. The autonomous driving includes, for example, levels 1 to 4 defined in Society of Automotive Engineers (SAE), but is not limited thereto, and may be optionally defined. Solely one vehicle 10 is exemplified in FIG. 1 for convenience of the description, but the number of vehicles 10 included in the information processing system 1 may be one or more.

The information processing device 20 is, for example, a server device, but is not limited thereto, and may be any general-purpose electronic apparatus, such as a personal computer (PC) or a smartphone, or may be another electronic apparatus dedicated to the information processing system 1. Solely one information processing device 20 is exemplified in FIG. 1 for convenience of the description, but the number of information processing devices 20 included in the information processing system 1 may be one or more.

As an outline of the embodiment, the information processing device 20 acquires, from the vehicle 10 through the network 30, information on an occupant of the vehicle 10 acquired by the vehicle 10. The occupant of the vehicle 10 includes the driver and a passenger of the vehicle 10. The number of passengers of the vehicle 10 may be one or more. The information processing device 20 stores a cause of an accident caused by the passenger of the vehicle 10 and control information for operating the vehicle 10 to eliminate the cause of the accident. The information processing device 20 transmits the control information to the vehicle 10 through the network 30 when determination is made that the stored cause of the accident occurs based on the information on the occupant. When the control information is received from the information processing device 20 through the network 30, the vehicle 10 affects a perception of the occupant, thereby operating to eliminate the cause of the accident.

For example, in a case where the cause of the accident is that a speech and behavior of the passenger in a vehicle cabin is noisy, the vehicle 10 voice-outputs a message for prompting the passenger to be careful in the speech and behavior. For example, in a case where the cause of the accident is that an inside of the vehicle cabin is hot and stuffy for the passenger, the vehicle 10 allows air conditioning of the inside of the vehicle cabin to be adapted for at least the passenger among the occupants. As described above, the vehicle 10 operates to eliminate the cause of the accident.

Thus, according to the embodiment, the information processing system 1 operates to eliminate the cause of the accident in consideration of the passenger of the vehicle 10. Accordingly, the driver of the vehicle 10 included in the information processing system 1 is less likely to cause the accident based on at least the cause of the accident caused by the passenger. As a result, the information processing system 1 can reduce a probability of occurrence of the accident.

Next, each configuration of the information processing system 1 will be described in detail.

Vehicle

Figure 2:
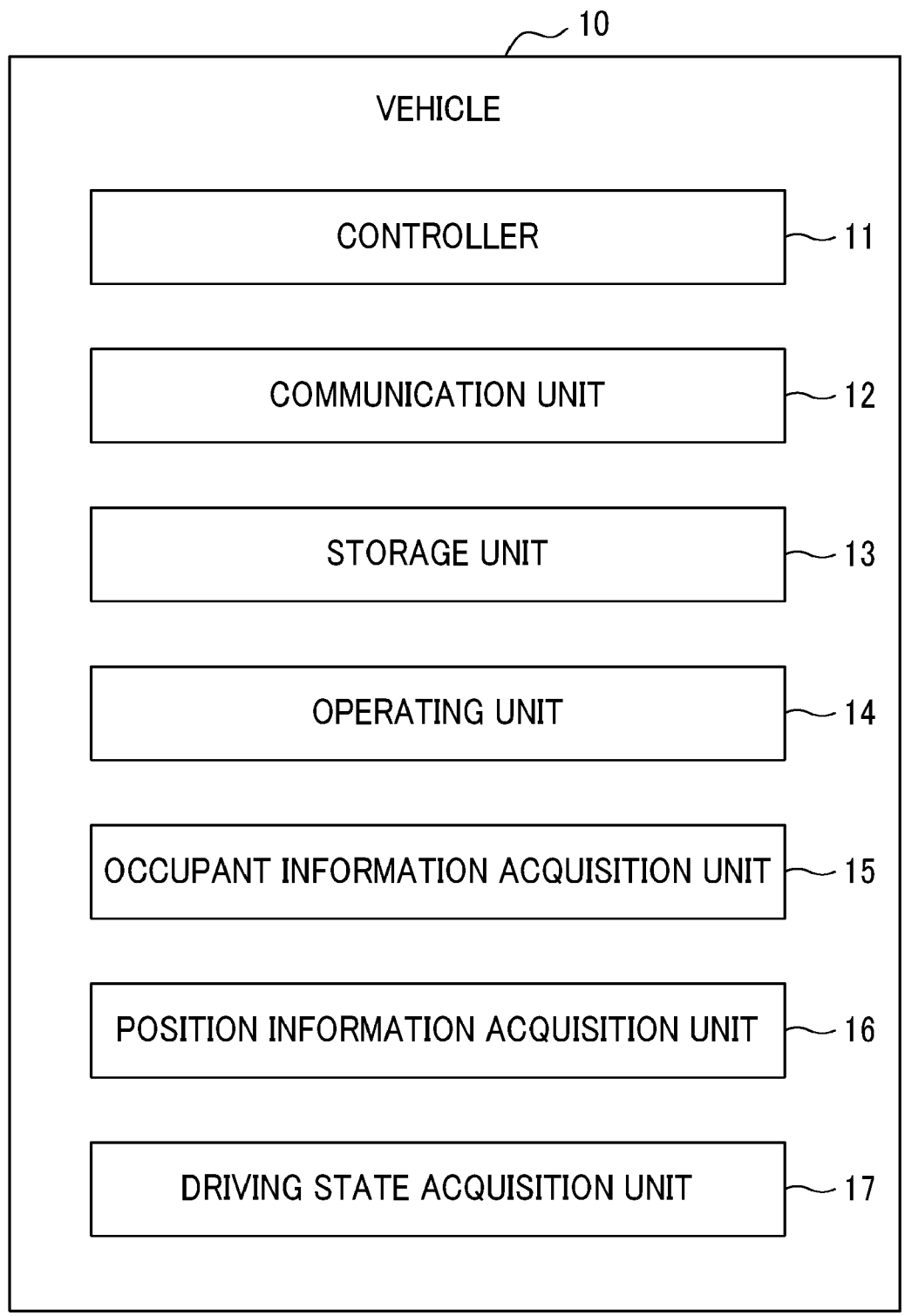
FIG. 2 is a block diagram showing a schematic configuration of a vehicle.

FIG. 2 is a block diagram showing a schematic configuration of the vehicle 10. As shown in FIG. 2, the vehicle 10 includes a controller 11, a communication unit 12, a storage unit 13, an operating unit 14, an occupant information acquisition unit 15, a position information acquisition unit 16, and a driving state acquisition unit 17. The constituent units constituting the vehicle 10 are communicatively connected with one another through, for example, an on-vehicle network, such as controller area network (CAN), or a dedicated line.

The controller 11 includes one or more processors. In the embodiment, the "processor" is a general-purpose processor or a dedicated processor specialized for specific processing, but is not limited thereto. An electronic control unit (ECU) mounted on the vehicle 10 may function as the controller 11. The controller 11 is communicatively connected, for example, with each constituent unit constituting the vehicle 10, and controls the operation of the entire vehicle 10. In the embodiment, for example, the controller 11 controls each acquisition unit to acquire various kinds of information. For example, the controller 11 controls the communication unit 12 to transmit the acquired various kinds of information to the information processing device 20 through the network 30.

The communication unit 12 includes a communication module that communicates through an on-vehicle network or a dedicated line. The communication unit 12 includes a communication module connected to the network 30. For example, the communication unit 12 may include a communication module compatible with mobile communication standards, such as 4th Generation (4G) and 5th Generation (5G). For example, an on-vehicle communication apparatus, such as data communication module (DCM), may function as the communication unit 12. In the embodiment, the vehicle 10 is connected to the network 30 through the communication unit 12.

The storage unit 13 includes one or more memories. In the embodiment, the "memory" is, for example, a semiconductor memory, a magnetic memory, or an optical memory, but is not limited thereto. Each memory included in the storage unit 13 may function as, for example, a main storage device, an auxiliary storage device, or a cache memory. The storage unit 13 stores predetermined information used for the operation of the vehicle 10. For example, the storage unit 13 may store a system program, an application program, road traffic information, road map information, various kinds of information acquired by each acquisition unit of the vehicle 10, and the like. The information stored in the storage unit 13 may be updatable with, for example, information to be acquired from the network 30 through the communication unit 12.

The operating unit 14 includes any output device that operates to affect the perception of the occupant of the vehicle 10. The perception includes a somatic sensation including vision, hearing, smell, taste, warmth, coldness, or the like and a sense of balance. The operating unit 14 may include, for example, a car navigation device that operates to mainly affect the vision and the hearing of the occupant of the vehicle 10. The operating unit 14 may include, for example, any voice output device other than the car navigation device, which operates to mainly affect the hearing of the occupant of the vehicle 10. The operating unit 14 may include, for example, any image output device other than the car navigation device, which operates to mainly affect the vision of the occupant of the vehicle 10. The operating unit 14 may include, for example, an air conditioner that operates to mainly affect the warmth and the coldness of the occupant of the vehicle 10. When the control information is received from the information processing device 20 through the network 30, the operating unit 14 operates to eliminate the cause of the accident caused by the passenger.

The occupant information acquisition unit 15 acquires the information on the occupant in the cabin of the vehicle 10. In the embodiment, the occupant information acquisition unit 15 includes, for example, an in-vehicle cabin camera for imaging an inside of the cabin of the vehicle 10 and a voice microphone installed in the cabin of the vehicle 10 and connected to the CAN. The occupant information acquisition unit 15 acquires, for example, the information on the occupant from an image captured by the in-vehicle cabin camera and output information output by the voice microphone. At this time, the information on the occupant includes the speech and behavior of the occupant of the vehicle 10. The occupant information acquisition unit 15 may always acquire the information on the occupant or may periodically acquire the information.

The occupant information acquisition unit 15 may acquire the information on the occupant from the image captured by the in-vehicle cabin camera by using, for example, a face recognition technique. In addition, the occupant information acquisition unit 15 may acquire the information on the occupant from the image captured by the in-vehicle cabin camera by using any image recognition technique. The occupant information acquisition unit 15 may acquire the information on the occupant from the output information output by the voice microphone by using, for example, a voice recognition technique and any other recognition technique.

The configuration of the occupant information acquisition unit 15 is not limited to the content described above. The occupant information acquisition unit 15 may include any other image sensor, without being limited to the in-vehicle cabin camera. The occupant information acquisition unit 15 may include any other sound sensor, without being limited to the voice microphone.

The information on the occupant is not limited to the content described above. The information on the occupant may include, for example, at least one of an expression, a face direction, a line of sight, a blinking state, a gesture, the number, belongings, and a driving (riding) duration of the occupant of the vehicle 10, and attribute information including age, gender, nationality, and race. The information on the occupant may include, for example, sound information caused by the occupant including a conversation content between the occupants, a voice generated by the occupant's behavior for expressing other voice languages, a sound generated by the occupant's behavior for expressing other sounds, and the like.

The configuration of the occupant information acquisition unit 15 is not limited to the content described above. The occupant information acquisition unit 15 may include any biological sensor installed in the cabin of the vehicle 10 and connected to the CAN. The occupant information acquisition unit 15 may acquire, for example, information on the occupant from the output information output by the biological sensor. At this time, the information on the occupant may include, for example, a biological state of the occupant including an electroencephalogram, a cerebral blood flow, a blood pressure, a blood sugar level, a blood amino acid, a heart rate, a pulse, a body temperature, a sensible temperature, a sense of hunger, a fatigue, and the like.

The position information acquisition unit 16 acquires position information of the vehicle 10. In the embodiment, the position information acquisition unit 16 includes one or more receivers compatible with any satellite positioning system. For example, the position information acquisition unit 16 includes a global positioning system (GPS) receiver. At this time, the position information acquisition unit 16 acquires the position information of the vehicle 10 based on the GPS. The position information includes, for example, the latitude, the longitude, the altitude, and the traveling lane position. The position information acquisition unit 16 may always acquire the position information of the vehicle 10 or may periodically acquire the position information.

The configuration of the position information acquisition unit 16 is not limited to the content described above. The position information acquisition unit 16 may include a geomagnetic sensor, an angular acceleration sensor, and the like. At this time, the position information acquisition unit 16 may acquire the direction to which the vehicle 10 is directed.

The driving state acquisition unit 17 includes any sensor connected to the CAN. The sensor includes, for example, any sensor that can acquire a driving state of the vehicle 10, such as a speed sensor and a steering angle sensor. The driving state acquisition unit 17 acquires, for example, the driving state of the vehicle 10 from the output information output by the sensor. The driving state includes, for example, a speed, a steering state, an accelerator state, a brake state, a clutch state, a blinker state, a gear state, and a seat belt state of the vehicle 10. The driving state acquisition unit 17 may always acquire the driving state or may periodically acquire the driving state.

Information Processing Device

Figure 3:
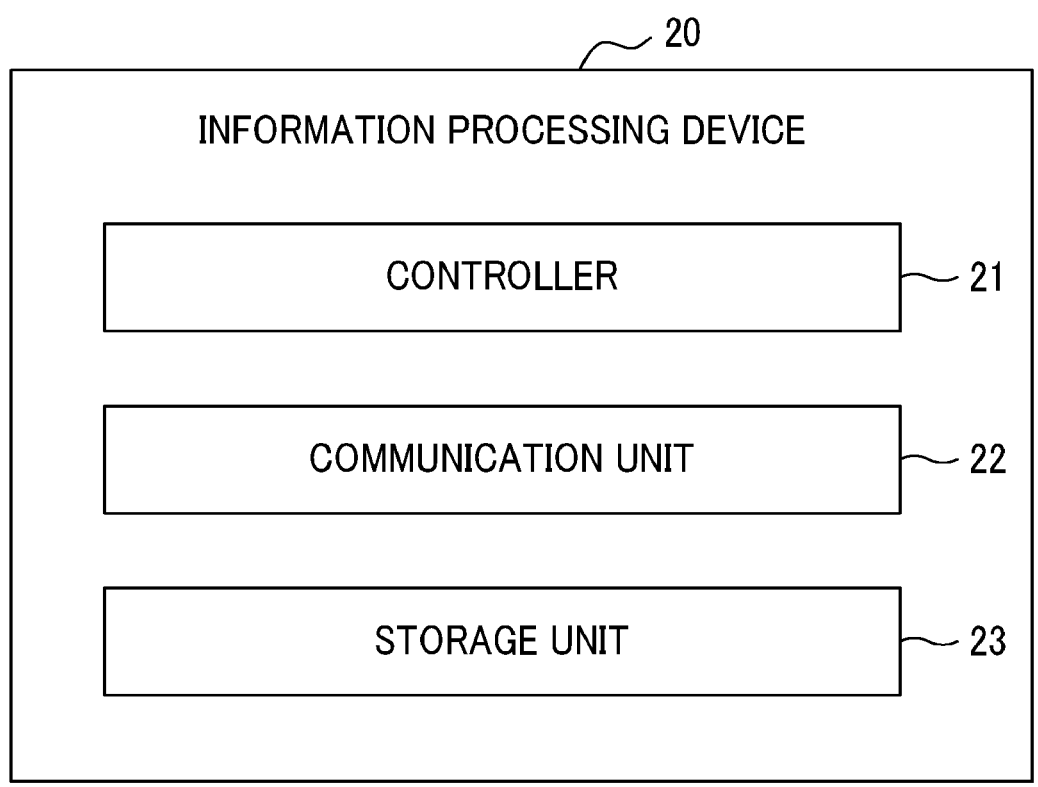
FIG. 3 is a block diagram showing a schematic configuration of an information processing device.

FIG. 3 is a block diagram showing a schematic configuration of the information processing device 20. As shown in FIG. 3, the information processing device 20 includes a controller 21, a communication unit 22, and a storage unit 23.

The controller 21 includes one or more processors. The controller 21 is connected with each constituent unit constituting the information processing device 20 and controls the operation of the entire information processing device 20. For example, the controller 21 controls the communication unit 22 to acquire various kinds of information from the vehicle 10 through the network 30. For example, the controller 21 controls the storage unit 23 to store information needed for the operation of the information processing system 1 in the storage unit 23.

The communication unit 22 includes a communication module connected to the network 30. For example, the communication unit 22 may include a communication module compatible with a wired local area network (LAN) standard. In the embodiment, the information processing device 20 is connected to the network 30 through the communication unit 22.

The storage unit 23 includes one or more memories. Each memory included in the storage unit 23 may function as, for example, a main storage device, an auxiliary storage device, or a cache memory. The storage unit 23 stores predetermined information used for the operation of the information processing device 20. For example, the storage unit 23 may store a system program, an application program, road traffic information, road map information, various kinds of information acquired by each acquisition unit of the vehicle 10, and the like. The storage unit 23 stores other information needed for the operation of the information processing system 1. For example, the storage unit 23 stores a cause of an accident caused by the passenger and control information for operating the operating unit 14 of the vehicle 10 to eliminate the cause of the accident. The information stored in the storage unit 23 may be updatable with, for example, information to be acquired from the network 30 through the communication unit 22.

The cause of the accident caused by the passenger may be analyzed based on information on an accident that occurred in the past, which is stored in the storage unit 23. The information on the accident that occurred in the past may be managed as big data, for example, by aggregating all data on various past accidents in the information processing device 20. The cause of the accident caused by the passenger may be analyzed by the controller 21, for example, based on machine learning. At this time, the controller 21 may acquire, from an accident vehicle, information acquired by various acquisition units from before occurrence of the accident to the time of the accident, for example, in a case where the accident vehicle includes the various acquisition units corresponding to the occupant information acquisition unit 15 and the driving state acquisition unit 17. The controller 21 may accurately analyze the cause of the accident based on the information acquired from the accident vehicle. Similarly, the control information, which is stored in the storage unit 23, for operating the operating unit 14 of the vehicle 10 to eliminate the cause of the accident may be calculated by the controller 21, for example, based on machine learning. The controller 21 may have any configuration for learning processing to execute the analysis and calculation processing described above.

The controller 21 determines whether or not the cause of the accident stored in the storage unit 23 occurs based on the information on the occupant acquired by the occupant information acquisition unit 15 of the vehicle 10. The controller 21 may more accurately determine whether or not the cause of the accident stored in the storage unit 23 occurs based on at least one of the information acquired by the driving state acquisition unit 17 of the vehicle 10 and a comfort level of the occupant described below as well as the information on the occupant acquired by the occupant information acquisition unit 15 of the vehicle 10. For example, the controller 21 may comprehensively determine whether or not the cause of the accident stored in the storage unit 23 occurs based on all information including the information acquired by each of the occupant information acquisition unit 15 and the driving state acquisition unit 17 of the vehicle 10, and the comfort level of the occupant described below. As described above, the information processing system 1 can determine with higher accuracy whether or not the cause of the accident occurs.

When determination is made that the cause of the accident occurs, the controller 21 causes the communication unit 22 to transmit the corresponding control information stored in the storage unit 23 to the operating unit 14 of the vehicle 10 through the network 30. When the control information is received from the information processing device 20, the operating unit 14 of the vehicle 10 operates to eliminate the cause of the accident.

The controller 21 may determine whether or not the cause of the accident stored in the storage unit 23 is eliminated based on at least one of the information acquired by each of the occupant information acquisition unit 15 and the driving state acquisition unit 17 of the vehicle 10, and the calculated comfort level of the occupant. For example, the controller 21 may comprehensively determine whether or not the cause of the accident stored in the storage unit 23 is eliminated based on all information including the information acquired by each of the occupant information acquisition unit 15 and the driving state acquisition unit 17 of the vehicle 10, and the calculated comfort level. As described above, the information processing system 1 can determine with higher accuracy whether or not the cause of the accident is eliminated.

The controller 21 may determine whether or not the control information stored in the storage unit 23 is effective based on at least one of the information acquired by each of the occupant information acquisition unit 15 and the driving state acquisition unit 17 of the vehicle 10, and the calculated comfort level of the occupant. For example, the controller 21 may comprehensively determine whether or not the control information stored in the storage unit 23 is effective based on all information including the information acquired by each of the occupant information acquisition unit 15 and the driving state acquisition unit 17 of the vehicle 10, and the calculated comfort level of the occupant. As described above, the information processing system 1 can determine an effectiveness of the control information with higher accuracy.

The controller 21 may apply the above series of processing to machine learning. With this, the controller 21 can calculate effective control information that more effectively affects the occupant of the vehicle 10 and more reliably eliminates the cause of the accident, and appropriately update the control information stored in the storage unit 23.

The controller 21 may calculate the comfort level of the occupant in the cabin of the vehicle 10, for example, by machine learning based on the information on the occupant acquired by the occupant information acquisition unit 15 of the vehicle 10. The controller 21 may have any configuration for learning processing to execute such calculation processing. The comfort level of the occupant may be calculated based on any index. For example, the comfort level of the occupant may be represented by a numerical value of zero to 100. The larger the value of the comfort level of the occupant, the higher the comfortableness of the occupant in the cabin of the vehicle 10. Conversely, the smaller the value of the comfort level of the occupant, the smaller the comfortableness of the occupant in the cabin of the vehicle 10. The comfort level of the occupant may be calculated for each occupant. In a case where a plurality of occupants is present, the comfort level may be calculated as an average value of the comfort levels of the occupants.

The controller 21 may determine whether or not the cause of the accident stored in the storage unit 23 occurs based on the comfort level of the occupant. For example, the controller 21 may compare a comfort level of an occupant in a cabin of the accident vehicle when the cause of the accident occurred with the comfort level of the occupant in the cabin of the vehicle 10 calculated based on the information on the occupant.

The controller 21 may determine whether or not a difference between the two comfort levels of the occupants is equal to or less than a predetermined threshold. When determination is made that the difference between the two comfort levels of the occupants is equal to or less than the predetermined threshold, the controller 21 may decide that a similar cause of the accident also occurs in the vehicle 10.

The controller 21 may determine whether or not the cause of the accident stored in the storage unit 23 is eliminated based on the comfort level of the occupant. For example, the controller 21 may compare the comfort level of the occupant of the accident vehicle described above with a comfort level of the occupant of the vehicle 10 after the operation of the operating unit 14 based on the control information. The controller 21 may determine whether or not a difference between the two comfort levels of the occupants is larger than a predetermined threshold and the comfort level of the occupant in the cabin of the vehicle 10 is increased. When determination is made that the comfort level of the occupant in the cabin of the vehicle 10 is increased, the controller 21 may decide that a similar cause of the accident is eliminated in the vehicle 10.

The controller 21 may determine whether or not the control information stored in the storage unit 23 is effective based on the comfort level of the occupant. For example, the controller 21 may calculate, based on the information on the occupant, the comfort level of the occupant in the cabin of the vehicle 10 before and after the operation of the operating unit 14 based on the control information. The controller 21 may compare the comfort level of the occupant before the operation of the operating unit 14 based on the control information with the comfort level of the occupant after the operation of the operating unit 14 based on the control information. The controller 21 may determine whether a difference between the two comfort levels of the occupants is positive or negative. The controller 21 may decide that the operation of the operating unit 14 based on the corresponding control information is effective for the occupant of the vehicle 10, for example, when determination is made that the difference between the two comfort levels of the occupants is positive and the comfort level of the occupant is increased between before and after the operation of the operating unit 14. On the other hand, the controller 21 may decide that the operation of the operating unit 14 based on the corresponding control information is not effective for the occupant of the vehicle 10, for example, when determination is made that the difference between the two comfort levels of the occupants is negative and the comfort level of the occupant is decreased between before and after the operation of the operating unit 14.

In addition, the controller 21 may determine whether or not the difference between the two comfort levels of the occupants before and after the operation of the operating unit 14 is equal to or greater than the predetermined threshold. The controller 21 may decide that the operation of the operating unit 14 based on the corresponding control information greatly increases or decreases the comfort level of the occupant of the vehicle 10 and the influence on the occupant is large when determination is made that the difference between the two comfort levels of the occupants is equal to or greater than the predetermined threshold. On the other hand, the controller 21 may decide that the operation of the operating unit 14 based on the corresponding control information slightly increases or decreases the comfort level of the occupant of the vehicle 10 and the influence on the occupant is small when determination is made that the difference between the two comfort levels of the occupants is smaller than the predetermined threshold.

FIG. 4 is a table showing a specific example of information stored in the storage unit 23 of the information processing device 20. The processing for accident prevention to be executed by the information processing system 1 will be more specifically described with reference to FIG. 4. In FIG. 4, for convenience of the description, it is described that one set of the cause of the accident and the corresponding control information is associated with position information at each point at which the accident occurred. However, at each point, a plurality of sets of the cause of the accident and the corresponding control information may be associated with the position information.

For example, in a point P1 at which the accident occurred in the past, the cause of the accident stored in the storage unit 23 may include a cause based on the speech and behavior of the passenger of the accident vehicle. For example, the cause of the accident may be that the passenger in the cabin of the accident vehicle was violently noisy, for example, the passenger was excited while watching the scenery outside the vehicle or a child who is the passenger cried due to the vibration of the accident vehicle. At this time, the controller 21 may store, in the storage unit 23, the control information for outputting a voice for prompting the passenger of the vehicle 10 to be careful in the speech and behavior to the operating unit 14 of the vehicle 10 as the corresponding control information.

In such a case, the controller 21 determines, for example, that the cause of the accident described above occurs based on the speech and behavior of the passenger of the vehicle 10 acquired by the occupant information acquisition unit 15 of the vehicle 10. According to a determination result, the controller 21 transmits the corresponding control information to the operating unit 14 of vehicle 10. For example, the operating unit 14 of the vehicle 10 includes the car navigation device. The car navigation device of the operating unit 14 executes the voice output for prompting the passenger of the vehicle 10 to be careful in the speech and behavior based on the control information transmitted from the information processing device 20.

For example, in a point P2 at which the accident occurred in the past, the cause of the accident stored in the storage unit 23 may include a cause based on the air conditioning in the cabin of the accident vehicle. For example, the cause of the accident may be that the inside of the vehicle cabin was hot and stuffy for the passenger. For example, in the point P2, based on such cause of the accident, the accident occurred because the passenger in a back seat prompted the driver to manipulate the air conditioner in order to optimize the air conditioning in the vehicle cabin. At this time, the controller 21 may store, in the storage unit 23, the control information for allowing the air conditioning in the cabin of the vehicle 10 to be adapted for at least the passenger among the occupants of the vehicle 10 as the corresponding control information.

In such a case, the controller 21 determines, for example, that the cause of the accident described above occurs based on at least one of the expression and the gesture of the occupant of the vehicle 10 acquired by the occupant information acquisition unit 15 of the vehicle 10. For example, the controller 21 may determine that the cause of the accident occurs by directly acquiring the expression and the gesture of the passenger among the occupants or may determine that the cause of the accident occurs by estimating a state of the passenger from the expression and the gesture of the driver among the occupants. According to a determination result, the controller 21 transmits the corresponding control information to the operating unit 14 of vehicle 10. For example, the operating unit 14 of the vehicle 10 includes the air conditioner. The air conditioner of the operating unit 14 allows the air conditioning in the cabin of the vehicle 10 to be adapted for at least the passenger among the occupants of the vehicle 10 based on the control information transmitted from the information processing device 20.

Operation Flow of Information Processing System

FIG. 5 is a sequence diagram showing an example of an operation flow of the information processing system 1. The example of the operation flow of the information processing system 1 will be described with reference to FIG. 5.

Step S100: The controller 21 of the information processing device 20 stores, in the storage unit 23, the cause of the accident caused by the passenger and the control information for operating the operating unit 14 of the vehicle 10 to eliminate the cause of the accident.

Step S101: The controller 11 of the vehicle 10 causes the occupant information acquisition unit 15 to acquire the information on the occupant in the cabin of the vehicle 10.

Step S102: The controller 11 of the vehicle 10 transmits the information on the occupant of the vehicle 10 acquired in Step S101 to the information processing device 20 by the communication unit 12. For example, the controller 21 of the information processing device 20 may always acquire the information on the occupant of the vehicle 10 from the communication unit 12 or may appropriately acquire the information on the occupant at a predetermined timing.

Step S103: The controller 21 of the information processing device 20 determines whether or not the cause of the accident stored in Step S100 occurs based on the information on the occupant of the vehicle 10.

Step S104: The controller 21 of the information processing device 20 determines that the cause of the accident occurs based on Step S103.

Step S105: The controller 21 of the information processing device 20 transmits the control information stored in Step S100 to the vehicle 10 after the determination of Step S104.

Step S106: The controller 11 of the vehicle 10 causes the operating unit 14 to affect the perception of the occupant of the vehicle 10 and operate to eliminate the cause of the accident when the control information is received in Step S105.

As described above, with the information processing system 1 according to the embodiment, it is possible to reduce the probability of occurrence of the accident in consideration of the passenger of the vehicle 10. In addition, for example, regardless of whether the vehicle 10 passes through the point P at which the accident occurred in the past, when the information processing system 1 determines that the cause of the accident similar to that in the past occurs, the operating unit 14 of the vehicle 10 operates to eliminate the cause of the accident. Accordingly, the driver of the vehicle 10 included in the information processing system 1 is less likely to cause new accident based on at least the cause of the accident that occurred in the past. As a result, the information processing system 1 can reduce the probability of occurrence of the accident.

The information processing system 1 determines whether or not the cause of the accident stored in the storage unit 23 occurs based on the comfort level of the occupant, whereby the information processing system 1 can determine occurrence of the cause of the accident with higher accuracy. With this, the information processing system 1 can operate the operating unit 14 based on the control information at an appropriate timing that can prevent occurrence of the accident. Accordingly, the information processing system 1 can more reliably eliminate the cause of the accident and reduce the probability of occurrence of the accident.

The information processing system 1 determines whether or not the cause of the accident occurs based on the driving state as well as the information on the occupant, whereby a determination accuracy is improved. For example, the information processing system 1 compares the driving state before occurrence of the accident acquired from the accident vehicle in the past accident with the driving state acquired from the driving state acquisition unit 17 of the vehicle 10, thereby determining whether or not the cause of the accident occurs with higher accuracy.

The information processing system 1 acquires the information on the occupant from the image captured by the in-vehicle cabin camera. In such a configuration, in a case where the cause of the accident is based on visual information, the information processing system 1 can accurately determine whether or not the cause of the accident occurs.

The operating unit 14 of the vehicle 10 executes the voice output for prompting the passenger of the vehicle 10 to be careful in the speech and behavior. In such a configuration, in a case where the influence on the driver by the speech and behavior of the passenger is the cause of the accident, the information processing system 1 can contribute to the reduction of the influence on the driver. For example, the passenger is careful in the speech and behavior by the output from the information processing system 1, whereby a concentration of the driver on driving is improved. With this, the information processing system 1 can reduce the probability of occurrence of the accident.

The cause of the accident caused by the passenger is analyzed based on the information on the accident that occurred in the past, whereby the information processing system 1 can reduce the probability that the accident that occurred in the past recurs. The driver of the vehicle 10 included in the information processing system 1 is less likely to cause new accident based on at least the cause of the accident that occurred in the past.

The disclosure has been described based on the drawings and the examples, but it is to be noted that those skilled in the art easily perform various modifications and changes based on this disclosure. Therefore, it is to be noted that these modifications and changes are included in the scope of the disclosure. For example, the functions and the like included in each unit, each step, or the like can be disposed again so as not to be logically contradictory, and a plurality of units, steps, or the like can be combined into one, or divided.

For example, in the embodiment described above, each constituent unit of the vehicle 10 has been described as being mounted on the vehicle 10. However, some or all of the processing operations executed by each constituent unit of the vehicle 10 can be executed by any electronic apparatus, such as a smartphone or a computer.

For example, a general electronic apparatus, such as a smartphone or a computer, can be configured to function as each constituent unit of the vehicle 10 or the information processing device 20 according to the embodiment described above. For example, a program, in which processing contents for realizing each function of the communication unit 12 or the like according to the embodiment are described, is stored in a memory of the electronic apparatus and causes a processor of the electronic apparatus to read and execute the program. Therefore, the disclosure according to the embodiment can also be realized as the program that can be executed by the processor.

In the embodiment described above, the vehicle 10 and the information processing device 20 are communicatively connected with each other through the network 30. However, the information processing device 20 can be configured to be mounted on the vehicle 10 and directly acquire the information to be acquired by the vehicle 10 from the vehicle 10 not through the network 30. That is, the vehicle 10 and the information processing device 20 can be configured to directly transmit and receive information not through the network 30.

At this time, similarly to the embodiment described above, the controller 11 and the controller 21 may be configured by different processors, and may be separately included in the vehicle 10 and the information processing device 20, respectively. Unlike the embodiment described above, the controller 11 and the controller 21 may be configured by the same processor, and may be configured as one controller included in both the vehicle 10 and the information processing device 20. That is, the above-described processing operations of the vehicle 10 and the information processing device 20 may be realized by one controller.

In the embodiment described above, the information processing system 1 has been described to calculate the comfort level of the occupant in the cabin of the vehicle 10 based on the information on the occupant. However, the information calculated based on the information on the occupant is not limited to the comfort level of the occupant in the vehicle cabin. The information calculated based on the information on the occupant may be any index associated with reaction of the occupant that includes a favorable impression, a surprise degree, a boredom degree, an irritability, a calmness, and the like of the occupant in the vehicle cabin.

In the embodiment described above, the information processing system 1 has been described to analyze the cause of the accident caused by the passenger based on the information on the accident that occurred in the past. However, the cause of the accident caused by the passenger stored in the storage unit 23 may be optionally decided by, for example, a manager of the information processing system 1. At this time, the information processing system 1 may compare the comfort level of the occupant and the driving state of the vehicle 10 optionally decided by the manager in relation with the cause of the accident caused by the passenger with the comfort level of the occupant calculated by the controller 21 and the driving state of the vehicle 10 acquired by the controller 21, thereby determining whether or not the cause of the accident stored in the storage unit 23 occurs.

What is claimed is:

1. An information processing system comprising:
a vehicle; and
an information processing device configured to transmit and receive information to and from the vehicle, wherein:
the vehicle includes
an occupant information acquisition unit configured to acquire information on an occupant in a cabin of the vehicle, and
an operating unit configured to operate to change a perception of the occupant;
the information processing device includes
a controller, and
a storage unit;
the storage unit is configured to store a cause of an accident caused by a passenger of the vehicle and control information for operating the operating unit to eliminate the cause of the accident;
the controller is configured to transmit the control information to the operating unit of the vehicle when determination is made that the cause of the accident occurs based on the information on the occupant; and
the operating unit of the vehicle is configured to operate to eliminate the cause of the accident when the control information is received.

2. The information processing system according to claim 1, wherein the controller is configured to
calculate a comfort level of the occupant in the cabin of the vehicle based on the information on the occupant, and
determine whether or not the cause of the accident occurs based on the comfort level of the occupant.

3. The information processing system according to claim 1, wherein:
the vehicle includes a driving state acquisition unit configured to acquire a driving state of the vehicle; and
the controller of the information processing device is configured to determine whether or not the cause of the accident occurs based on the driving state.

4. The information processing system according to claim 1, wherein the occupant information acquisition unit includes an in-vehicle cabin camera and a voice microphone installed in the cabin of the vehicle, and is configured to acquire the information on the occupant from an image captured by the in-vehicle cabin camera and output information output by the voice microphone.

5. The information processing system according to claim 4, wherein:
the information on the occupant includes a speech and behavior of the passenger of the vehicle;
the operating unit includes a car navigation device;
the cause of the accident includes a cause based on the speech and behavior of the passenger;
the control information includes control information on a voice output for prompting the passenger of the vehicle to change the speech and behavior; and
the operating unit is configured to execute the voice output when the control information is received.

6. The information processing system according to claim 1, wherein the cause of the accident caused by the passenger is analyzed based on information on an accident that occurred in the past.

7. A non-transitory computer readable medium storing a program that operates in an information processing system including a vehicle and an information processing device configured to transmit and receive information to and from the vehicle, the program causing
the vehicle to execute:
acquiring information on an occupant in a cabin of the vehicle; and
operating to change a perception of the occupant, and
the information processing device to execute:
storing a cause of an accident caused by a passenger of the vehicle and control information used in the operating to eliminate the cause of the accident;
determining whether or not the cause of the accident occurs based on the information on the occupant; and
transmitting the control information to the vehicle when determination is made that the cause of the accident occurs,
wherein when the vehicle receives the control information, the operating includes operating to eliminate the cause of the accident.

8. A control method in an information processing system including a vehicle and an information processing device configured to transmit and receive information to and from the vehicle, the control method comprising:
in the vehicle,
acquiring information on an occupant in a cabin of the vehicle; and
operating to change a perception of the occupant; and
in the information processing device, storing a cause of an accident caused by a passenger of the vehicle and control information used in the operating to eliminate the cause of the accident;

determining whether or not the cause of the accident occurs based on the information on the occupant; and transmitting the control information to the vehicle when determination is made that the cause of the accident occurs, wherein when the vehicle receives the control information, the operating includes operating to eliminate the cause of the accident.

9. The non-transitory computer readable medium according to claim 7, wherein the program further causes the information processing device to execute:

calculating a comfort level of the occupant in the cabin of the vehicle based on the information on the occupant, and determining whether or not the cause of the accident occurs based on the comfort level of the occupant.

10. The non-transitory computer readable medium according to claim 7, wherein the program further causes:

the vehicle to execute acquiring a driving state of the vehicle, and the information processing device to execute determining whether or not the cause of the accident occurs based on the driving state.

11. The non-transitory computer readable medium according to claim 7, wherein the program further causes the vehicle to execute acquiring the information on the occupant in the cabin of the vehicle from an image captured by an in-vehicle cabin camera and output information output by a voice microphone installed in the cabin of the vehicle.

12. The non-transitory computer readable medium according to claim 11, wherein the information on the occupant includes a speech and behavior of the passenger of the vehicle;

the cause of the accident includes a cause based on the speech and behavior of the passenger;

the control information includes control information on a voice output for prompting the passenger of the vehicle to change the speech and behavior; and the program further causes the vehicle to execute the voice output when the control information is received.

13. The non-transitory computer readable medium according to claim 7, wherein the cause of the accident caused by the passenger is analyzed based on information on an accident that occurred in the past.

14. The method according to claim 8, wherein the method further comprises, in the information processing device:

calculating a comfort level of the occupant in the cabin of the vehicle based on the information on the occupant, and determining whether or not the cause of the accident occurs based on the comfort level of the occupant.

15. The method according to claim 8, wherein the method further comprises:

in the vehicle, acquiring a driving state of the vehicle, and in the information processing device, determining whether or not the cause of the accident occurs based on the driving state.

16. The method according to claim 8, wherein the method further comprises, in the vehicle, acquiring the information on the occupant in the cabin of the vehicle from an image captured by an in-vehicle cabin camera and output information output by a voice microphone installed in the cabin of the vehicle.

17. The method according to claim 16, wherein the information on the occupant includes a speech and behavior of the passenger of the vehicle;

the cause of the accident includes a cause based on the speech and behavior of the passenger;

the control information includes control information on a voice output for prompting the passenger of the vehicle to change the speech and behavior; and the method further comprises, in the vehicle, to executing the voice output when the control information is received.

18. The method according to claim 8, wherein the cause of the accident caused by the passenger is analyzed based on information on an accident that occurred in the past.

* * * * *